(12) United States Patent
Gretz

(10) Patent No.: US 8,933,350 B1
(45) Date of Patent: Jan. 13, 2015

(54) ELECTRICAL BOX WITH EXTENSIONS TO MATCH VARIOUS REVEALS

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 226 days.

(21) Appl. No.: 13/681,078

(22) Filed: Nov. 19, 2012

(51) Int. Cl.
*H01H 9/02* (2006.01)
*H02G 3/22* (2006.01)
*H02G 1/00* (2006.01)

(52) U.S. Cl.
CPC ...... *H02G 3/22* (2013.01); *H02G 1/00* (2013.01)
USPC .......................................... 174/666

(58) Field of Classification Search
USPC ........................................... 174/666
See application file for complete search history.

(56) References Cited

U.S. PATENT DOCUMENTS

| 5,142,102 | A  | * | 8/1992 | Michie | 174/50 |
| 7,528,322 | B1 | * | 5/2009 | Gretz  | 174/57 |
| 7,582,827 | B1 | * | 9/2009 | Gretz  | 174/50 |

* cited by examiner

*Primary Examiner* — Jenny L Wagner
*Assistant Examiner* — Michael P McFadden

(57) ABSTRACT

A pan box assembly for fixtures for use on exterior walls. The box assembly includes a base unit, which is mounted directly to a flat surface substrate, and two extension elements. The unit, along with the extension elements, allows for modification of certain dimensions of the box assembly so that it can be used with three different finish thicknesses. The extension elements may be added or removed without uninstalling the box or removing the back of the box.

14 Claims, 5 Drawing Sheets

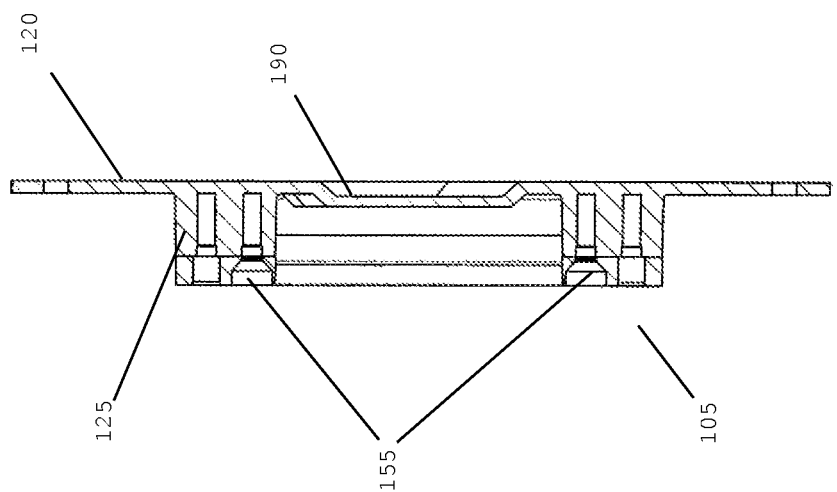
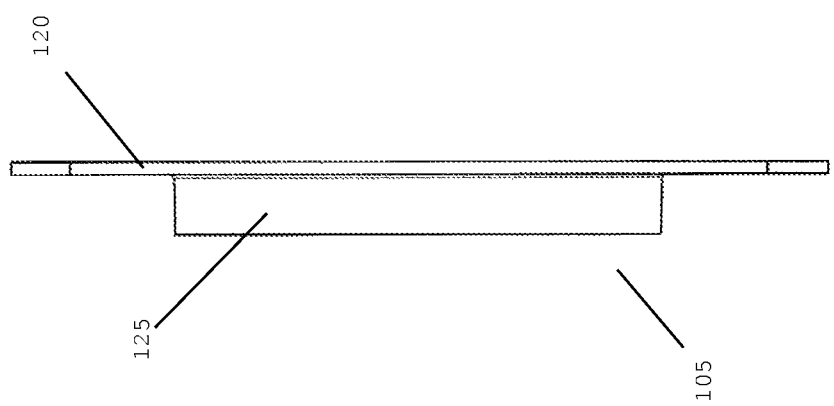

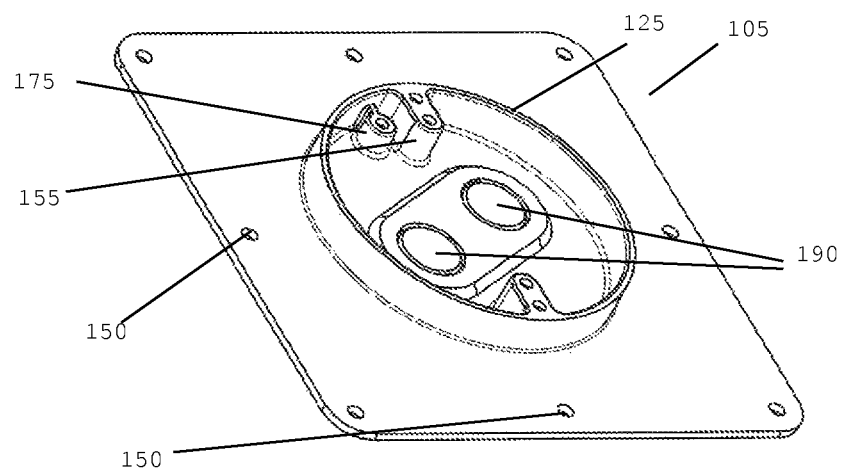
Fig 6
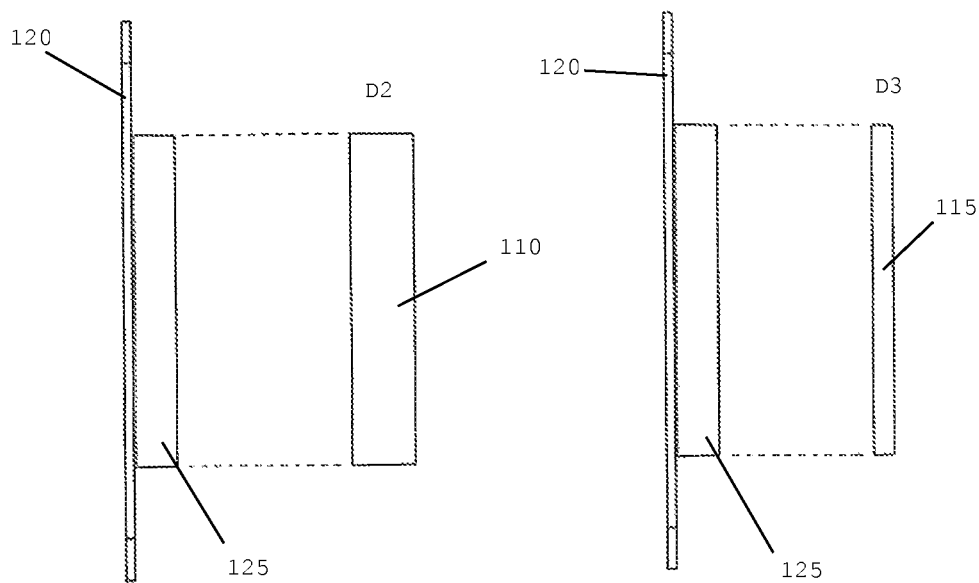
Fig 7 · Fig 8

ELECTRICAL BOX WITH EXTENSIONS TO MATCH VARIOUS REVEALS

FIELD OF THE INVENTION

The present invention relates to assemblies for the mounting of electrical devices and fixtures, and, more specifically, to electrical box assemblies which are typically installed and utilized in the exterior walls of buildings and other structures.

BACKGROUND OF THE INVENTION

A common goal in installing electrical boxes for fixtures in exterior walls, particularly those having a stucco finish, is to install the face of the box substantially flush with the exterior wall surface.

Stucco is frequently applied to exterior walls in order to create a decorative but durable coating. The depth of the stucco application is typically defined by an architectural stucco reveal system. The stucco reveal system typically includes interconnecting strips of material, or reveals, which are attached to an underlying substrate. The reveals provide a screed edge which will define the location of the face surface of the stucco and thus the depth of the stucco. The reveals are usually provided in several standard sizes in order to form a desired stucco depth. Typically, stucco applications are completed in one of three particular thicknesses, i.e., 1⅜ inch, ⅞ inch, and ⅝ inch.

As a result of the various conventional depths of stucco applications on exterior walls, several sizes of electrical boxes are required at the job site in order to insure that the electrical box is flush with the wall finish. It is therefore desirable to have a single electrical box assembly that can be configured at the job site to match the installed reveal and thereby mount the electrical box flush with the stucco surface.

OBJECT OF THE INVENTION

It is a goal of the invention to provide a fixture box that mounts directly to a flat surface to be used on exterior walls such that it is able to sit essentially flush with the finished coating on such walls.

It is a further goal of the invention to provide a fixture box with interchangeable extension elements so as to permit the box to be used on exterior walls having varying finish thicknesses. More specifically, it is an object of the invention to provide an electrical box assembly which facilitates the mounting of electrical fixtures in applications having any of three different finish thicknesses and, therefore, requiring one of three different reveals.

It is another goal to provide a pan box which is mountable directly on the flat surface of a substrate so as to avoid the need to cut large holes in the substrate.

It is a further goal to minimize the cost of the box assembly by constructing it of a minimal number of parts.

SUMMARY OF THE INVENTION

The present invention describes an electrical box assembly for the installation of fixtures on exterior wall surfaces having varying finish thicknesses. The box assembly mounts directly to the flat-surface substrate and alleviates the need to cut large holes in the substrate for installation. The box assembly can be used by itself or with one of two extension rings, thereby insuring that the box provides the desired reveal when used in conjunction with any of three wall finish thicknesses, namely 1⅜", ⅞", and ⅝" finishes.

DESCRIPTION OF THE DRAWINGS

FIG. 4 is a side view of the pan box assembly disclosed herein.

FIG. 5 is a sectional side view of the pan box assembly disclosed herein.

FIG. 6 is a perspective view of the pan box assembly disclosed herein.

FIG. 7 is an exploded side view of the pan box assembly including a first extension element.

FIG. 8 is an exploded side view of the pan box assembly including a second extension element.

TABLE OF NOMENCLATURE AND PARTS

Figure 1:
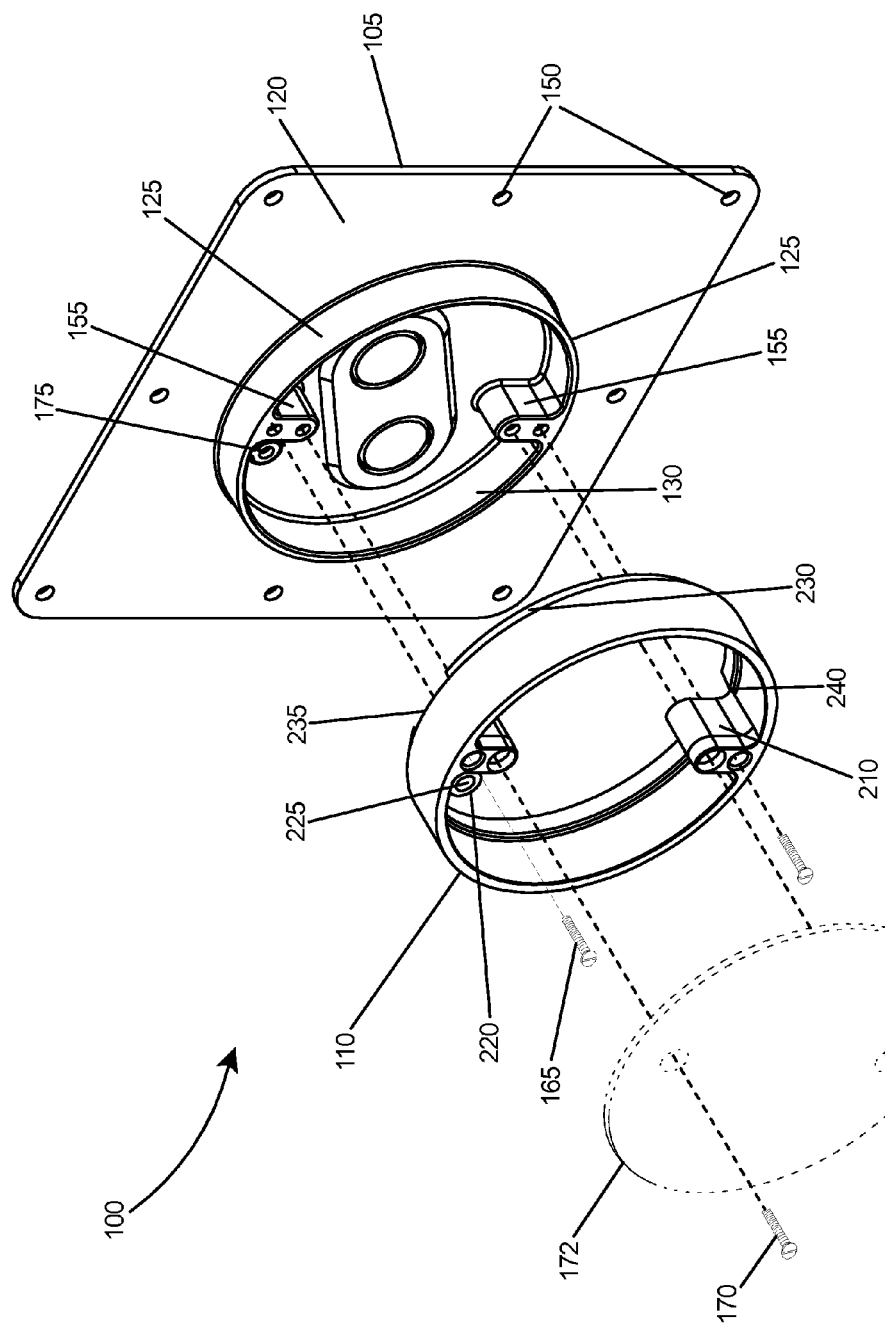
FIG. 1 is an exploded perspective view of the pan box assembly disclosed herein.

The following is a listing of the nomenclature and parts, along with accompanying reference numerals, that are used to describe the invention set forth herein:

| Part Number | Brief Description |
|---|---|
| 100 | Electrical box assembly |
| 105 | Base unit |
| 110 | First extension element |
| 115 | Second extension element |
| 120 | Base plate |
| 125 | Side wall |
| 130 | Interior space |
| 150 | Apertures |
| 155 | Boss |
| 160 | Bore |
| 165 | Fastener |
| 170 | Fastener |
| 172 | Base of Fixture |
| 175 | Grounding boss |
| 185 | Mounting section |
| 190 | Knockout portions |
| 200 | Depression |
| 210 | Extension element boss |
| 215 | Extension element bore |
| 220 | Extension element grounding boss |
| 225 | Extension element grounding boss bore |
| 230 | Lip |

DETAILED DESCRIPTION

FIG. 1 illustrates a first embodiment of the electrical pan box assembly 100 disclosed herein. The pan box assembly 100 includes a base unit 105, a first extension element 110 (shown in FIG. 1), and a second extension element 115 (shown in FIGS. 10 and 11). The base unit 105 includes a base plate 120 which is generally quadrilateral in shape and has a front section and a rear section. In the preferred embodiment shown in FIG. 1, the base plate 120 is of a substantially square shape. A sidewall 125 extends outward from the front section of the base plate 120. The sidewall 125 defines an interior space 130 being bounded on one end by the base plate 120 and being open to the exterior on the other end. The base plate 120 includes apertures 150 therein. The apertures 150 are capable of receiving fasteners (not shown) which pass through the base plate 120 and terminate in or beyond the mounting substrate (not shown).

Figure 2:
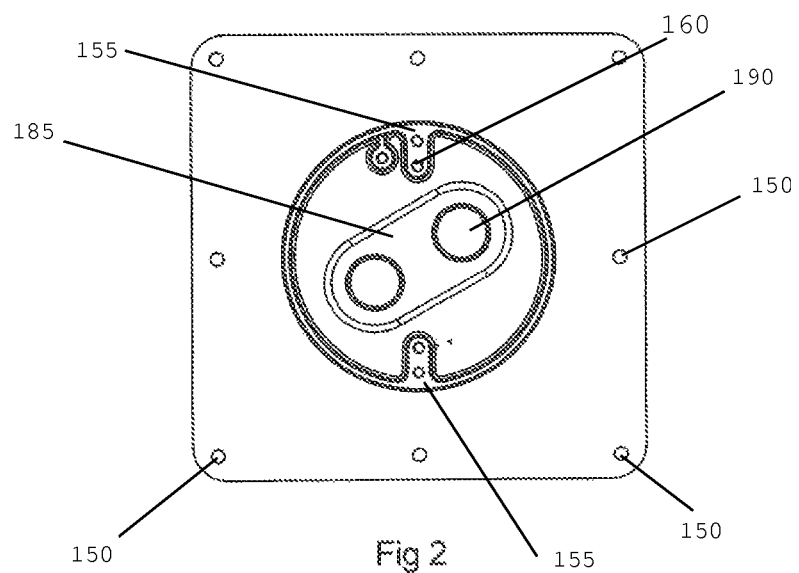
FIG. 2 is a front view of the pan box assembly disclosed herein.

As seen in FIGS. 1 and 2, one or more bosses 155 are integral with the sidewall 125 and extend into the interior space 130. These bosses 155 may contact or originate from the base plate 120 but they need not do so. The bosses 155 include bores 160 therein. FIG. 5 is a cross-sectional view of the base unit 105 including the bosses and bores therein. The bores are directed toward the front end and are disposed to receive fasteners 165 for securing first extension unit 110 to base unit 105 and fasteners 170 for securing base 172 of fixture (not shown) to first extension unit 110. The preferred embodiment includes four bosses 155, namely, two mounting bosses (for mounting either of said optional spacers 110, 115) and two fastening bosses (for fastening an electrical device within said assembly 100). In this embodiment shown in FIG. 2, a mounting boss and a fastening boss are located at a first position on the sidewall 125 and a second mounting boss and fastening boss are located on a second, opposed position on the sidewall 125. The assembly 100 also includes a grounding boss 175 which is integral with the sidewalls 125 of the base plate 120. The grounding boss 175 further includes a bore 180 directed toward the front section and capable of receiving a grounding screw (not shown).

Figure 3:
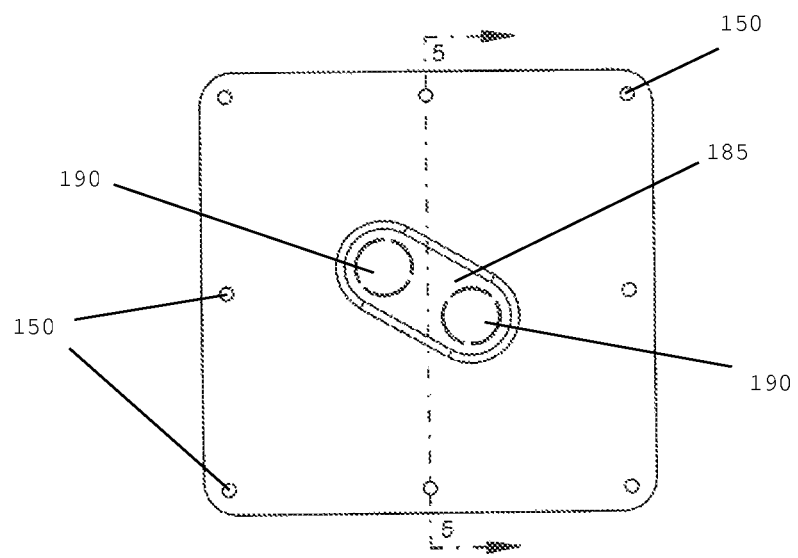
FIG. 3 is a rear view of the pan box assembly disclosed herein.

Referring to FIG. 2, the base plate 120 includes one or more mounting sections 185 that are on the portion of the base plate 120 enclosed by the sidewall 125. The mounting portion 185 includes one or more knockout portions 190 capable of being removed in order to provide a passageway for electrical cable or wire into or through the interior space 130. The mounting portion 185 is raised in any location where a knockout portion 190 is found; that is, the knockout portions 190 are mounted on mounting sections 185 of the base plate 120 which project slightly into the interior space 130. There is a corresponding depression 200 on the opposite side of the base plate 120, as shown in FIG. 3.

Figure 11:
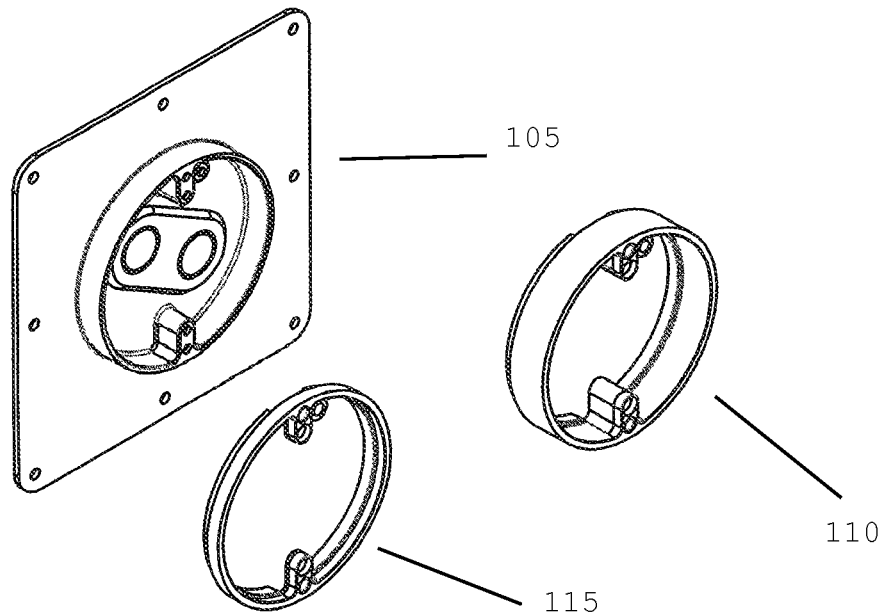
FIG. 11 is a perspective view of the base unit along with the extension elements.

The first extension element 110 is a ring, being cylindrical in nature with peripheral sidewalls and possessing a hollow center as shown in FIG. 11. The ring is of a circumference substantially identical to that of the base unit sidewall 125 and of a pre-determined depth $D_2$. The extension ring possesses a front side and a rear side both of which terminate in a planar face. Referring back to FIG. 1, the ring includes one or more bosses 210 integral with the ring 110 and extending into the interior space of the ring. The bosses include bores 215 therein which run through the length of the boss, resulting in an opening on both ends of the boss 210; the bores 215 are co-axial with corresponding bores in the base unit 105 in order to accomplish mounting of the spacer and an electrical device to the base unit 105.

Referring now to FIG. 2, the first extension element 110 also includes a grounding boss 220 which is integral with the body of the element 110. The grounding boss 220 includes a bore 225 therein which runs through the length of the boss 220 resulting in an opening on both ends of the grounding boss 220. Finally, the extension ring 110 includes a lip or flange 230 which extends outward from the rear side and circumscribes at least a portion of the ring. In the preferred embodiment shown in FIG. 1, the lip 230 circumscribes the entire portion of the rear side of the ring with the exception of a first break 235 and a second break 240. As noted above, the bosses 210 are positioned such that the bores in these bosses 215 may be axially aligned with the bores 160 in the bosses 155 of the base unit 105 and, further, and the grounding bosses 220 is positioned such that the bore 225 in the grounding boss 220 may be axially aligned with the bore 180 in the grounding boss 175 of the base unit 105.

The second extension element 115 is a ring, being cylindrical in nature and possessing a hollow center. The ring is of a circumference substantially identical to that of the sidewall 125 and of a pre-determined depth $D_3$. Aside from the difference in depth, the second extension element 115 is identical to the first extension element 110 and includes the same elements in the same orientation. It will be noted that in the preferred embodiment $D_2$ is equal to a value of ¾" and $D_3$ is equal to a value of ¼".

Figure 9:
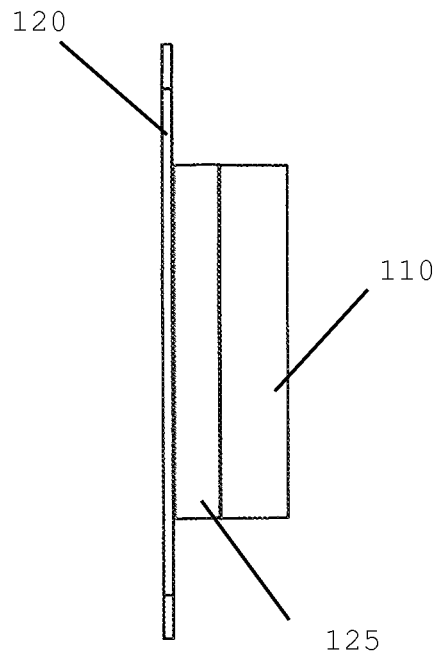
FIG. 9 is a side view of the pan box assembly including a first extension element.

In operation, a user first determines the desired reveal. The pan box assembly 100 may be distributed pre-assembled in any of the three thickness configurations. In a preferred embodiment, the pan box is pre-assembled to be used with 1⅜" wall finish thicknesses as seen in FIG. 1. Referring now to FIGS. 1, 7 and 9, the pan box configuration suitable for 1⅜" cladding use comprises the base unit 105 with the first extension element 110 attached thereto. The first extension element 110 is removably secured to the base unit 105 via one or more fasteners 165 which pass through the bosses of the first extension element 110 and into the bosses 155 of the base unit 105. The lip 230 is seated in the interior space 130 and abuts the sidewall 125. The lip 230 includes breaks or spaces 235, 240 in the locations where the bosses and bores of the sidewall 125 and the extension element 110 are co-axial, as seen in FIG. 1. The lip 230 assists the user in properly aligning the base unit 105 and the extension element and, once aligned and seated, serves to prevent travel of the extension element 110.

Once the cladding thickness is determined and the pan box assembly 100 is configured for such thickness, the user drills or otherwise creates a hole for the electrical wire or cable. It will be noted that when using this pan box assembly, the hole need only be large enough to accommodate the wire or cable and there is no need to cut or make a large hole in the substrate. Once the wire or cable is pulled through, the pan box assembly is installed to the substrate though the use of fasteners passing though the apertures 150 in the base plate 120.

Figure 10:
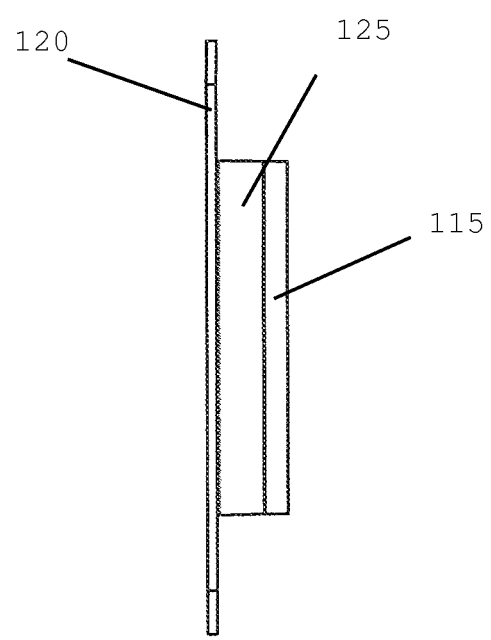
FIG. 10 is a side view of the pan box assembly including a second extension element.

The pan box assembly 100 is easily adapted for use with two other finish thicknesses. In order to use the pan box assembly 100 in a ⅝" cladding application, the base unit 105 is used without any extension elements as seen in FIG. 6. The base unit 105 is mounted to the substrate and no extension rings are attached to the base unit. Referring now to FIGS. 8 and 10, in order to use the pan box assembly 100 in a ⅞" cladding application, the base unit 105 is used with the second extension element 115. The base unit 105 is mounted to the substrate and the second extension ring 115 is secured in the same fashion as the first extension element 110. Accordingly, the pan box assembly is suitable for 1⅜" cladding by using the base unit 105 and the first extension element 110, suitable for ⅝" cladding by removing all extension elements and using the base unit 105 alone, and suitable for ⅞" cladding by using the base unit and the second extension element 115. The desired reveal can therefore be changed or altered without uninstalling or removing the base unit, rather, the reveal can be modified by simply adding or removing the extension elements 110, 115.

The base unit 105 and optional extension spacer elements 110, 115 allow one box to work with the most commonly found exterior wall finishes. The invention alleviates the need to stock multiple boxes for multiple finishing thicknesses. Further, as the pan box is mounted directly on a flat surface, there is no need to cut a large hole in the substrate to mount the assembly. The extra-wide base plate 120 prevents water and air intrusion between the flange and stucco; no gaskets or caulking are required. Moreover, the knockout mounting sections 185 are raised such that adaptor rings or other connectors may be installed in the knockout opening without causing the assembly to extend beyond the plane of the base plate 120.

In a preferred embodiment, the electrical box assembly 100 is composed of a non-metallic thermoplastic material such as polypropylene, polyethylene, polyvinyl chloride, polycarbonate, or acrylonitrile butadiene styrene. The use of these materials assures that the device box assembly 100 possesses appropriate non-corrosive and non-conductive properties. This construction further assures that the assembly 100 is compatible with most building surfaces.

While the invention has been described in reference to certain preferred embodiments, it will be readily apparent to one of ordinary skill in the art that certain modifications or variations may be made to the system without departing from the scope of the invention claimed below and described in the foregoing specification.

What is claimed is:

1. An electrical box assembly configurable for use with various size reveals comprising:
    a baseplate, wherein said baseplate is substantially quadrilateral in shape and has a front section and a rear section;
    a sidewall extending from a portion of said baseplate and defining an interior space, one end of said sidewall terminates in a planar face;
    an annular spacer for optionally extending the length of said sidewall; said spacer including a peripheral wall matching the shape and circumference of said sidewall;
    a mounting arrangement, including a boss, for mounting said spacer to said sidewall as needed for accommodating reveals;
    a fastening arrangement, including a boss, for securing an electrical component to said sidewall and optionally said annular spacer; and
    said annular spacer comprises:
        two planar faces;
        a first annular spacer having a first height;
        a second annular spacer having a second height, wherein the first height is not equal to the second height; and
    said first and second annular spacers include a flange extending around at least a portion of the circumference of said peripheral wall in order to assist in securing said first annular spacer or said second annular spacer to said base plate.

2. The electrical box assembly of claim 1 wherein said mounting arrangement, including a boss, for mounting said spacer to said sidewall includes:
    a mounting boss extending from said sidewall of said base plate, said mounting boss including a bore therein; said bore being oriented such that it is aligned along an axis perpendicular to the plane of said base plate; and
    a first spacer boss extending from said sidewall of said optional spacer; said first spacer boss including a bore therein; said first spacer boss and said bore therein being adapted for alignment with said mounting boss in such a manner that said bore of said first spacer boss is coaxial with said bore of said mounting boss.

3. The electrical box assembly of claim 2 wherein said a fastening arrangement, including a boss, for securing an electrical component to said sidewall includes:
    a fastening boss extending from said sidewall of said base plate, said fastening boss including a bore therein;
    said bore being oriented such that it is aligned along an axis perpendicular to the plan of said base plate; and
    a second spacer boss extending from said sidewall of said optional spacer; said second spacer boss including a bore therein; said second spacer boss and said bore therein being adapted for alignment with said fastening boss in such a manner that said bore of said second spacer boss is coaxial with said bore of said fastening boss.

4. The reversible electrical box assembly of claim 3 including a grounding arrangement wherein said grounding arrangement includes:
    a boss extending from said sidewall of said base member, said grounding boss including a bore therein;
    said bore being oriented such that it is aligned along an axis perpendicular to the plan of said base plate; and
    a third spacer boss extending from said sidewall of said optional spacer and including a bore therein; said third spacer boss and said bore therein being adapted for alignment with said grounding boss in such a manner that said bore of said third spacer boss is coaxial with said bore of said grounding boss.

5. The electrical box assembly of claim 4 wherein
    said baseplate includes two fastening bosses and two mounting bosses; and
    said spacer includes two first spacer bosses and two second spacer bosses.

6. The electrical box assembly of claim 5 wherein said two mounting bosses on said baseplate are diametrically positioned on said sidewall and, further said two first spacer bosses are diametrically positioned on said spacer.

7. The electrical box assembly of claim 5 wherein said two fastening bosses on said baseplate are diametrically positioned on said sidewall and, further said two second spacer bosses are diametrically positioned on said spacer.

8. The electrical box assembly of claim 1 wherein said baseplate includes a mounting section on said baseplate portion within said interior space.

9. The electrical box assembly of claim 8 wherein said mounting section includes at least one removable knockout portion therein.

10. The electrical box assembly of claim 9 wherein said rear mounting section is raised and projects into said interior space.

11. The electrical box assembly of claim 10 further comprising a depression on a portion of the rear of said base plate corresponding with the location where said mounting section projects into the interior space.

12. The electrical box assembly of claim 1 wherein
    said sidewall possess an annular profile; and
    said interior space is essentially cylindrical in shape.

13. The electrical box assembly of claim 1 wherein said baseplate has at least one aperture capable of receiving a fastener whereby a fastener can be passed through the aperture to mount said box assembly to a substrate.

14. An electrical box assembly comprising:
    a cylindrical hollow body having sidewalls, a front opening, and a rear opening;
    said hollow body being capable of receiving extension elements of varying depth so as to extend the length of said sidewalls;
    a sealing plate integral with said hollow body positioned so as to close the rear opening of the hollow body;
    said sealing plate and said sidewalls defining an interior space within said body; said sealing plate including a mounting section projecting into the interior space and having at least one removable knockout portion therein;
    a flange extending outward from said hollow body within the same plane as the sealing plate;

said flange having a first side and a second side;
at least two attachment bosses being integral with said body and being positioned within said interior space; said attachment bosses having bores oriented towards said front opening;
apertures in said flange for receipt of fasteners to secure said pan fixture box to a substrate, wherein said fixture box has sidewalls of such depth as to be suitable for use in applications involving exterior wall cladding;
a grounding boss being integral with said body and extending into said interior space; said grounding boss having a bore oriented towards said front opening and being capable of accepting a grounding screw;
a first extension element having a front side and a rear side; said first extension element being annular in nature and having a circumference essentially identical to that of said hollow body; said first extension element further including at least one attachment boss having a bore therein which is axially aligned with said bore in said attachment boss on said hollow body, at least one grounding boss having a bore therein which is axially aligned with said bore in said grounding boss on said hollow body, and a lip circumscribing at least a portion of the rear side of the first extension element, whereby said first extension element modifies said pan fixture box for use with a first cladding thickness; and
a second extension element having a front side and a rear side; said second extension element being annular in nature and having a circumference essentially identical to that of said hollow body; said second extension element further including at least one attachment boss having a bore therein which is axially aligned with said bore in said attachment boss on said hollow body, at least one grounding boss having a bore therein which is axially aligned with said bore in said grounding boss on said hollow body, and a lip circumscribing at least a portion of the rear side of the second extension element, whereby said second extension modifies said pan fixture box for use a second cladding thickness.

* * * * *